United States Patent Office

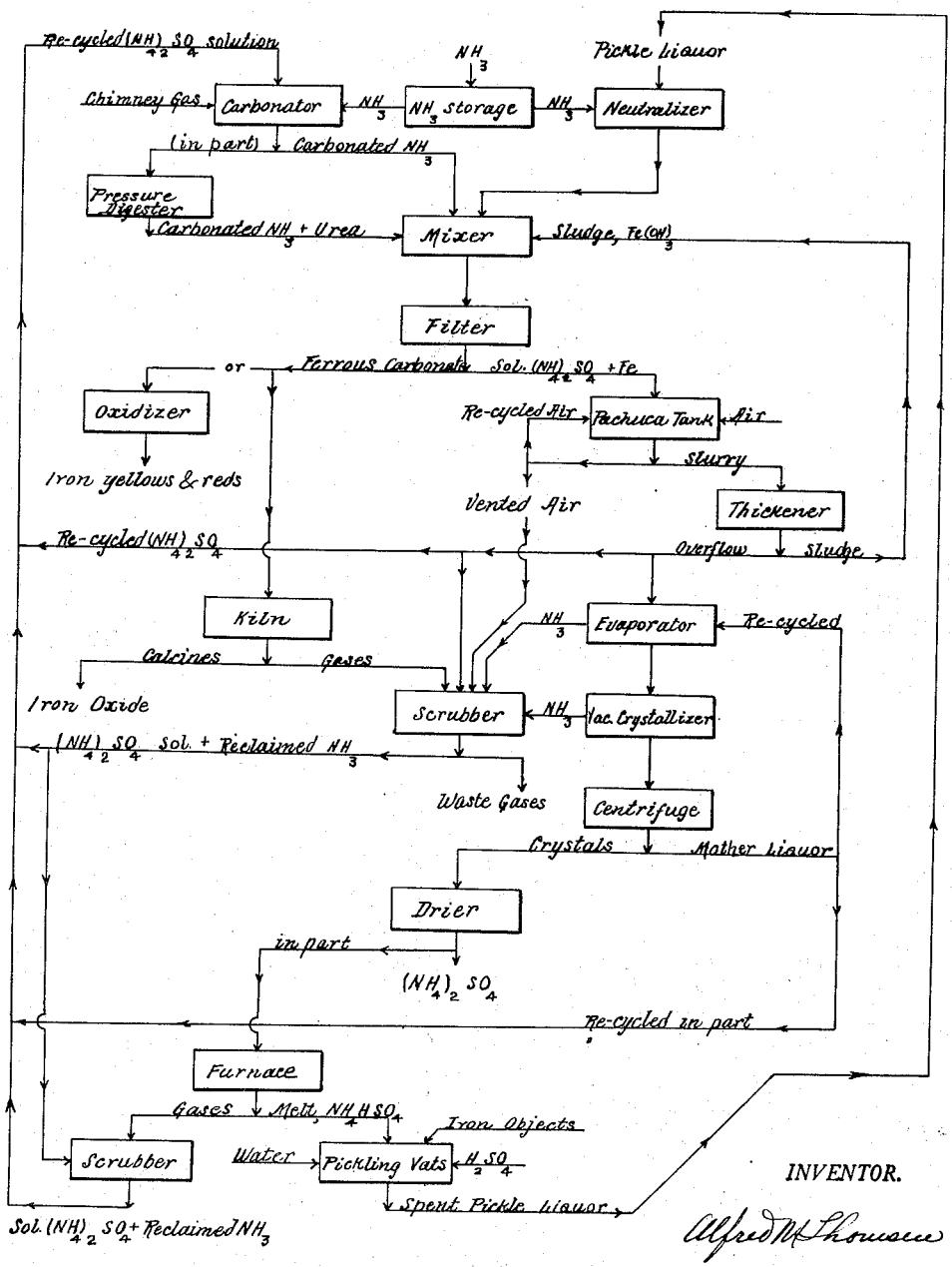

2,775,508
Patented Dec. 25, 1956

2,775,508

METHOD OF TREATING PICKLE LIQUORS

Alfred M. Thomsen, San Francisco, Calif.

Application April 28, 1951, Serial No. 223,519

9 Claims. (Cl. 23—61)

By the term "pickle liquor" as used herein I refer to that discard of the iron and steel industry consisting of a water solution of ferrous sulphate containing some free sulphuric acid, in the normal state in which it is discharged from the pickling vats. It is the aim and object of my process to obtain the iron resident in said solution in some commercial form, and to obtain the sulphuric acid likewise resident therein either in the form of ammonium sulphate or in the form of acid ammonium sulphate, a substance which may advantageously be returned to the pickling vats and thus diminish the consumption of sulphuric acid in the pickling operation.

To separate the iron I avail myself of the fact that ammonium carbonate added to said pickle liquor in adequate amount will precipitate ferrous carbonate in an easily filterable form, and that the iron still remaining in solution after the separation of said ferrous carbonate is easily oxidized by air and thus precipitated as ferric hydroxide, in easily settling or filterable form. While pure ammonium carbonate would do this work I prefer to make my own by commingling a water solution of ammonia with gases containing carbon dioxide and thus obtain in equilibrium with one another residual hydroxide, carbonate, carbamate, and bicarbonate of ammonia.

The various steps are indicated on the flow sheet and are best followed thereon but before I take up a complete description I wish to explain my objective a little more fully. It is of paramonut importance that this precipitate of ferrous carbonate be of such mechanical characteristic that it will form a thick cake upon a mechanical filter. I accomplish this by varying the composition of the carbonated ammonia, the name I shall use hereafter for the mixture previously described, in such a manner that optimum filterability is obtained. It is obvious that the state of equilibrium will vary with the degree of carbonation, i. e., with the ratio of carbonate to bi-carbonate. It is thus possibel for the operator to suit himself and his equipment to the varying types of pickle liquor and by proper analysis of his carbonated ammonia to find out for himself which gives the best results, and then adopt the same as his standard. Another way of saying this is to state that proper carbonation must, in each individual instance, be determined empirically.

Another way of improving this precipitate is by the presence of some urea. If a portion of the carbonated ammonia be by-passed through a pressure digester and heated in the orthodox manner for urea conversion some urea will be formed. All the various methods appearing in the literature are devoted merely to ways and means of improving yield or to improvements in separating the urea from the unreatced ammonia compounds. Manifestly, all such matters are of no interest herein so it is only necessary to by-pass such an amount of the carbonated ammonia through the pressure digestion stage as is required to maintain a constant concentration of urea in the circuit. In this connection it is also of interest that such urea in the ammonium sulphate solution has the effect of increasing the size of the individual crystal of ammonium sulphate and thus very much improving its mechanical properties during centrifuging and drying.

Another item influencing the entire sequence of operations is the presence of more or less ammonium sulphate in the various solutions. It is advantageous to have this as high as possible, and the high solubility of ammonium sulphate in water lends itself well to such practice. In addition it does, of course, diminish both the size of the evaporator required as well as the consumption of fuel in the evaporating step. For this reason I have indicated throughout the use of intermediate solutions of ammonium sulphate where a medium is required for the absorption of either ammonia or carbon dioxide. This limits the evaporation virtually to the actual water resident in spent pickle liquor, to wash water, and to possible steam condensation in heating.

Having thus specifically explained the reasons for these various steps, I shall now explain the flow sheet in full detail with such added information as may be needed. As my process appears on said flow sheet it constitutes my preferred version but it is obvious that sundry steps can be omitted so I do not limit myself to the use of all the items that appear, collectively, on said drawing.

In the center of the top line I have indicated a storage for anhydrous ammonia which is used both to the right and the left in the "neutralizer" and in the "carbonator" respectively. It is obvious that there would be no advantage in doing anything to the ammonia just needed for neutralizing so it is indicated as used in this manner, simply commingled with the acid pickle liquor in an amount sufficient to satisfy the free acid.

In the "carbonator" this ammonia is next commingled with any form of carbon dioxide, in this case chimney gas, and with a recycled solution of ammonium sulphate in place of water to produce that type of carbonated ammonia already described, the most advantageous carbon dioxide content being determined empirically.

Such carbonation as herein indicated can be performed in a simple series of scrubbers arranged in countercurrent fashion, or any other device customarily employed to commingle gaseous and liquid products can be substituted. A portion of this carbonated fluid is then by-passed through a pressure digester where it is heated to appropriate temperature for the requisite time to produce and maintain the proper urea concentration desired elsewhere in the circuit.

The neutralized pickle liquor is next commingled in the "mixer" with these two streams of carbonated ammonia with resultant formation of ferrous carbonate. The ammonium compound should be in slight excess and enough time should be allowed to permit of substantial equilibrium being obtained. The pickle liquor is commingled with a sufficient amount of the carbonated form of ammonia to precipitate as ferrous carbonate the major part of the iron resident therein. If the operation be performed on a continuous basis this means that the mixer should be of generous size and, if possible, two stage. The mixture may be heated, if desired, but in general the reactions will furnish all the heat needed.

I have next shown a filter as the means employed to effect separation between the liquid and solid portions of magma produced in the mixer, but any other means could manifestly be substituted. The ferrous carbonate thus separated will be dealt with later on and I will continue with the operations upon the liquid portion, essentially a solution of ammonium sulphate containing still a little iron, a small excess of carbonated ammonia, and a little urea.

This solution is next oxidized in a Pachuca tank, a device so well known in the cyanidation of gold ores that it needs no further description. I have shown the air used in the agitation as recycled, meaning by this term that the air injected into the bottom of said tank is drawn from above the surface of the same tank by the compressor, a small amount of fresh air being allowed to enter with the suction and then vented.

By this technique the loss of ammonia in aeration becomes confined to the relatively small amount of air vented and this is shown later on as scrubbed in a "scavenger scrubber" with a recycled flow of ammonium sulphate solution thus making the circuit virtually ammonia tight. Sundry other devices used later on are also connected with this same scrubber so that all ammonia loss is obviated.

The oxidation produces a precipitation of ferric hydroxide and I have shown the slurry thus produced separated into two products by means of a thickener, the clarified overflow going to an evaporator and the sludge being returned to the mixer. By thus commingling a very small amount of ferric hydroxide with the large bulk of ferrous carbonate the principal filtration will not become materially affected. Of course, this step could be omitted and a separate filtration for the ferric hydroxide could be introduced instead.

A portion of the overflow from the thickener may be sent to the scrubber hereinafter described and/or recycled to the carbonator as shown in the drawing.

The overflow from the thickener is next evaporated and crystallized in any manner desired but preferably in a multiple effect evaporator and a vacuum crystallizer. No description of such orthodox procedure is necessary but it would be desirable to connect both evaporator and crystallizer with the "scavenger" scrubber above described so that the small amount of ammonia evolved in both can be salvaged. While not shown on the flow sheet, it is obvious that the condensate from the evaporator could and would be used in the pickling vats as "make up" water if said condensate contained any ammonia of consequence.

The magma issuing from the crystallizer is separated into crystals and mother liquor, the latter being re-cycled to the evaporator. In this manner a small amount of urea becomes concentrated into a relatively large amount in this re-circulated medium, so a portion is shown as re-cycled back to the carbonator, keeping urea concentration constant.

I have represented this separation as effected in a centrifuge, and that would always be preferred, but it is obvious that other means would serve as well. In any event, the crystals are next dried and bagged for the market as a high grade ammonium sulphate, but I have next shown a way in which a producer of pickle liquor might wish to use a part and even the major part of the ammonium sulphate as made by my process instead of selling it as ammonium sulphate. Where a part only of the ammonium sulphate is to be used as next described, the ammonium sulphate solution after the precipitation and removal of the iron carbonate may be divided into two parts. One part may be aerated to precipitate any remaining iron, followed by removal of the precipitate and the crystallizing of the ammonium sulphate in the iron free solution as described. The second part of the ammonium sulphate solution may be dehydrated and the ammonium sulphate treated as next described.

Such ammonium sulphate is heated in a furnace to the relatively low temperature required for the liberation of about one-half of the resident ammonia, leaving as a residual acid ammonium sulphate. The temperature can be held well below 500° C. so there need be no decomposition of the evolved ammonia. On the flow sheet I have shown this ammonia salvaged in a scrubber irrigated with an ammonium sulphate solution and thus returned, to the carbonator. The fused bi-sulphate, or melt, leaving the furnace is returned in lieu of sulphuric acid for re-use in the pickling step. I have then shown the spent liquor from this pickling vat re-cycled to the neutralizer, thus completing the orbits of both ammonia and sulphuric acid. Manifestly, all that is involved in this seemingly complex step is a recycling of ammonium sulphate as the sole material employed.

Theoretically, it would thus seem possible to eliminate entirely the use of sulphuric acid in the pickling of iron objects but practically some acid would always be used and some ammonium sulphate would be split off and sold thus maintaining the circulating media in a state of relative purity. In addition, at present market balance of prices it would be far more profitable to sell ammonium sulphate than to re-cycle ammonium sulphate.

Having thus completed my description of the part played by ammonia and sulphuric acid in my process, I will now return to the further processing of the ferrous carbonate which now remains, in a sense, as a by-product of this operation. I have shown this ferrous carbonate as heated in a "kiln" to yield iron oxide, and a gas containing both ammonia and carbon dioxide, only the latter being indicated on the flow sheet. It is obvious that such ammonia can be recovered in the salvage scrubber, but it is also plain that said gases could constitute the "chimney gas" represented as used in the carbonator, and if the ferrous carbonate were treated in this manner then that would be a preferred use of said gas.

I have, however, shown an alternative and far more profitable use of such ferrous carbonate to the extent to which a market can be found for the products. If said ferrous carbonate is slowly oxidized by air the relatively large crystals become very porous, and on grinding produce an exquisite yellow pigment of great covering power and permanence. If after such oxidation the product be heated first an equally excellent red is produced and all shades, both red and yellow, are under perfect control by varying the time and temperature elements.

Still another way to use this product, after ignition, is to reduce it with hydrogen for a molding powder of rather outstanding characteristics. The term "iron, pure by hydrogen" is too well known to need description, I only wish to call attention to the fact that such ignited ferrous carbonate is an excellent raw material for such an operation. Manifestly, such applications as herein specified are beyond the scope of this application and belong elsewhere, specifically in other applications appropriate to the subject involved.

Throughout this description I have made no mention of apparatus required as all the devices called for are standard in the chemical industry. Nevertheless a word may be desirable on the subject of materials of construction. Wood is desirable in most cases where it is allowable and inasmuch as leaf filters of the Moore or Butter's type are principally of this cheap material their use is indicated. Steel is poorest of all ferrous materials, copper and its alloys even worse. Monel metal is definitely good, stainless steels (316–317) are excellent, cast iron will serve but is at best soon destroyed.

In reciting at length my preferred version I called attention at times to sundry variants. I will now add several more. Some pickle liquors are based on hydrochloric acid in place of sulphuric. On all such material my process is equally desirable, ammonium chloride being the end product in place of ammonium sulphate. I therefore consider such substitution to be within the frame of this disclosure. Manifestly, as the chloride adaptation of recycling of the final product would require an unknown acid chloride and as ammonium chloride is volatile without decomposition at the temperatures indicated such chloride pickle liquors could only be used to make ammonium chloride and re-cycling of same would not produce any saving in hydrochloric acid.

In another version, the oxidizing step might be left out if high purity of the finished ammonium sulphate is immaterial. If it were left out very little iron would contaminate the crystals and on re-cycling the iron containing mother liquor said iron would be eliminated in the next carbonate precipitation. Another modification would be to precipitate said iron as sulphide by adding a soluble sulphide, in this case ammonium sulphide, and settling out ferrous sulphide. This would eliminate the oxidizing step.

Another modification which may at some time suggest itself is to eliminate both the crystallizing and centrifuging steps and subject the liquid from the evaporator to direct evaporation in the drier. This is not difficult if the feed to the drier be composed of re-cycled, dried ammonium sulphate commingled with enough of the solution from the evaporator to produce a wet product for drying. Inasmuch as a more concentrated product could be yielded by the evaporator than if the crystallizing technique were pursed this procedure is not as wasteful of fuel as it might at first glance appear.

In physical appearance the product yielded by the drier is more or less agglomerated and if a screen be attached to the drier shell separation is easily made between coarse and fine material, the fines being recycled to the feed end of the drier. The coarse product, made in this manner, is ideally suited for certain agricultural uses for which it commands a premium and it is also prime material for conversion to bi-sulphate of ammonium by the furnace step previously described.

It is obvious that ammonium sulphate destined for re-cycling need not be purified in any manner beyond that of iron removal in the ferrous carbonate step so the ammonium sulphate solution is advantageously divided at this point into two portions one of which is purified for salable ammonium sulphate while the other is directly dehydrated and re-cycled in the form of impure acid ammonium sulphate.

It is likewise obvious that if pickle liquor is concentrated and crystallized, the iron sulphate being removed and the highly acid mother liquor being re-cycled to the pickling vats, then such iron sulphate can be worked by my process in the identical manner described for pickle liquor with the neutralizing step omitted, as any residual acid retained in the ferrous sulphate crystals will be insignificant and will be neutralized at once with carbonated ammonia.

While much of the ferrous sulphate on the market today is made from pickle liquor as just described, such use is limited by the relatively small amount of ferrous sulphate that can be sold and by the rapid increase in impurities in the recycled mother liquor. However, as an additive step to be used in conjunction with my process it might find a wider application. It is obvious that individual preference will be the deciding factor in all such modifications, hence I consider all such deviations from or combinations of the items appearing herein as a part of the disclosure which I have made.

Having thus fully described my process, I claim:

1. A method for the treatment of iron-bearing sulfate spent pickle liquor for the recovery of iron values therefrom and for the manufacture of ammonium sulfate, said method including the steps of forming a reagent solution consisting essentially of a mixture of a substantially iron-free aqueous solution of ammonium sulfate and the reaction products of ammonia and carbon dioxide, adding a slight excess of said reagent solution to pickle liquor to precipitate principally as iron carbonates the major part of the iron resident in said pickle liquor, removing the said iron precipitate by filtration to provide a solution of ammonium sulfate, dividing said ammonium sulfate solution into two parts, recirculating one of said parts to the first mentioned step for the production of said reagent solution, and treating the other of said parts for the separation of ammonium sulfate therefrom in crystalline form.

2. The method claimed in claim 1 wherein the said reagent is formed by commingling the said recirculated ammonium sulfate solution with ammonia and with chimney gases containing carbon dioxide.

3. The process claimed in claim 2 in which after the removal of the precipitate of iron carbonates, the resulting solution is aerated until iron remaining therein is separated out from the solution as ferric hydroxide, and removing said hydroxide from the solution.

4. The process claimed in claim 3 including the step of recovering the ammonium sulfate from the said solution by dehydration.

5. The method of making ammonium sulphate set forth in claim 2, with the added step that free sulphuric acid contained in said pickle liquor is reacted with ammonia prior to treating the pickle liquor with said solution containing a carbonated form of ammonia.

6. The method of making ammonium sulphate set forth in claim 2, with the added step of increasing the size of the crystals of ammonium sulphate by crystallizing said ammonium sulphate in the presence of urea, said urea being produced by subjecting at least a portion of said solution containing the carbonated form of ammonia to pressure and heat prior to treating the said pickle liquor therewith.

7. The method of making ammonium sulphate set forth in claim 2, with the added step that the small amount of iron still resident in the treated pickle liquor, after removal of the iron carbonate precipitate, is removed from said liquor by adding a sufficient amount of soluble sulphide to precipitate said iron as ferrous sulphide and is then separated from said liquor.

8. A procedure for recovering the values from spent sulfuric pickle liquor which comprises the steps of adding ammonia to the said pickle liquor to react with free sulfuric acid therein, commingling gases containing carbon dioxide with ammonia and a recycled solution of substantially iron free ammonium sulphate to produce a solution containing a carbonated form of ammonia, commingling a slight excess of said solution with said treated pickle liquor whereby to precipitate the greater part of the iron values resident therein as ferrous carbonate, separating the said ferrous carbonate from the solution by filtration, and recovering ammonium sulphate therefrom by crystallization, the said process being further characterized by the withdrawal of a portion of the said solution subsequent to the said filtration step for recycling to said step of forming the said solution containing a carbonated form of ammonia.

9. The process claimed in claim 8 further characterized by the steps of fusing at least a portion of the crystallized ammonium sulphate to produce ammonium bisulphate and ammonia, recycling the ammonia to said step of forming the said solution containing a carbonated form of ammonia for use in the said process, and employing said ammonium bisulphate in pickling iron whereby sulfuric pickle liquor is produced for treatment in the claimed process.

References Cited in the file of this patent

UNITED STATES PATENTS

| Number | Name | Date |
|---|---|---|
| 997,237 | Carrick | July 4, 1911 |
| 1,897,725 | Gaus | Feb. 14, 1933 |
| 1,944,327 | Hunyady | Jan. 23, 1934 |
| 1,983,320 | Sperr | Dec. 4, 1934 |
| 1,986,900 | Sperr | Jan. 8, 1935 |
| 1,994,702 | Harris | Mar. 19, 1935 |
| 2,201,522 | Depew | May 21, 1940 |
| 2,258,310 | Abbott | Oct. 7, 1941 |
| 2,271,524 | Marek | Feb. 3, 1942 |
| 2,331,235 | Ruys | Oct. 5, 1943 |
| 2,374,454 | Oliver | Apr. 24, 1945 |
| 2,375,977 | Davies | May 15, 1945 |
| 2,443,765 | Francis | June 22, 1948 |
| 2,511,307 | Tiddy et al. | June 13, 1950 |